(12) United States Patent
Wu et al.

(10) Patent No.: US 8,006,565 B2
(45) Date of Patent: Aug. 30, 2011

(54) PRESSURE SENSOR GRID

(75) Inventors: Wel Wu, Palo Alto, CA (US);
Shih-Yuan (S Y) Wang, Palo Alto, CA (US); Pratik Chaturvedi, Palo Alto, CA (US); Sagl Varghese Mathal, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 12/433,775

(22) Filed: Apr. 30, 2009

(65) Prior Publication Data

US 2010/0275697 A1 Nov. 4, 2010

(51) Int. Cl.
*G01L 9/00* (2006.01)

(52) U.S. Cl. .............................. 73/717; 73/719; 73/723

(58) Field of Classification Search .......................... None
See application file for complete search history.

(56) References Cited

U.S. PATENT DOCUMENTS

| | | | |
|---|---|---|---|
| 3,118,133 A * | 1/1964 | Meeker et al. | 365/52 |
| 4,234,813 A * | 11/1980 | Iguchi et al. | 310/366 |
| 4,412,209 A * | 10/1983 | Frame et al. | 341/33 |
| 4,574,438 A | 3/1986 | Diepers et al. | |
| 5,055,838 A * | 10/1991 | Wise et al. | 340/870.37 |
| 5,357,399 A * | 10/1994 | Salisbury | 361/529 |
| 5,491,879 A * | 2/1996 | Bauer | 29/25.35 |
| 5,756,904 A * | 5/1998 | Oreper et al. | 73/862.046 |
| 6,318,183 B1 | 11/2001 | Czarnocki | |

OTHER PUBLICATIONS

Miao, et al., Quantum Conductance Oscillations in Metal/Molecule/Metal Switches at Room Temperature,The American Physical Society, week ending Jul. 4, 2008, pp. 016802-1 to 016802-4, PRL 101.
Lau, et al., Scanned probe imaging of nanoscale conducting channels in Pt/alkanoic acid monolayer/Ti devices, Applied Physics A-Material Science & Processing, 2005, pp. 1373-1378.

* cited by examiner

*Primary Examiner* — Lisa Caputo
*Assistant Examiner* — Jermaine Jenkins

(57) ABSTRACT

A pressure sensor grid can comprise a plurality of bottom wires, arranged substantially parallel to each other and overlaid by a plurality of top wires arranged substantially perpendicular to the bottom wires. Each intersection of the top and bottom wires includes a pressure sensor. The sensor comprises a switching junction situated between the bottom wire and the top wire and a conducting channel extending through the switching junction from the bottom wire to the top wire. Pressure applied to the top wire causes an increase in conductance between the bottom wire and the top wire.

20 Claims, 2 Drawing Sheets

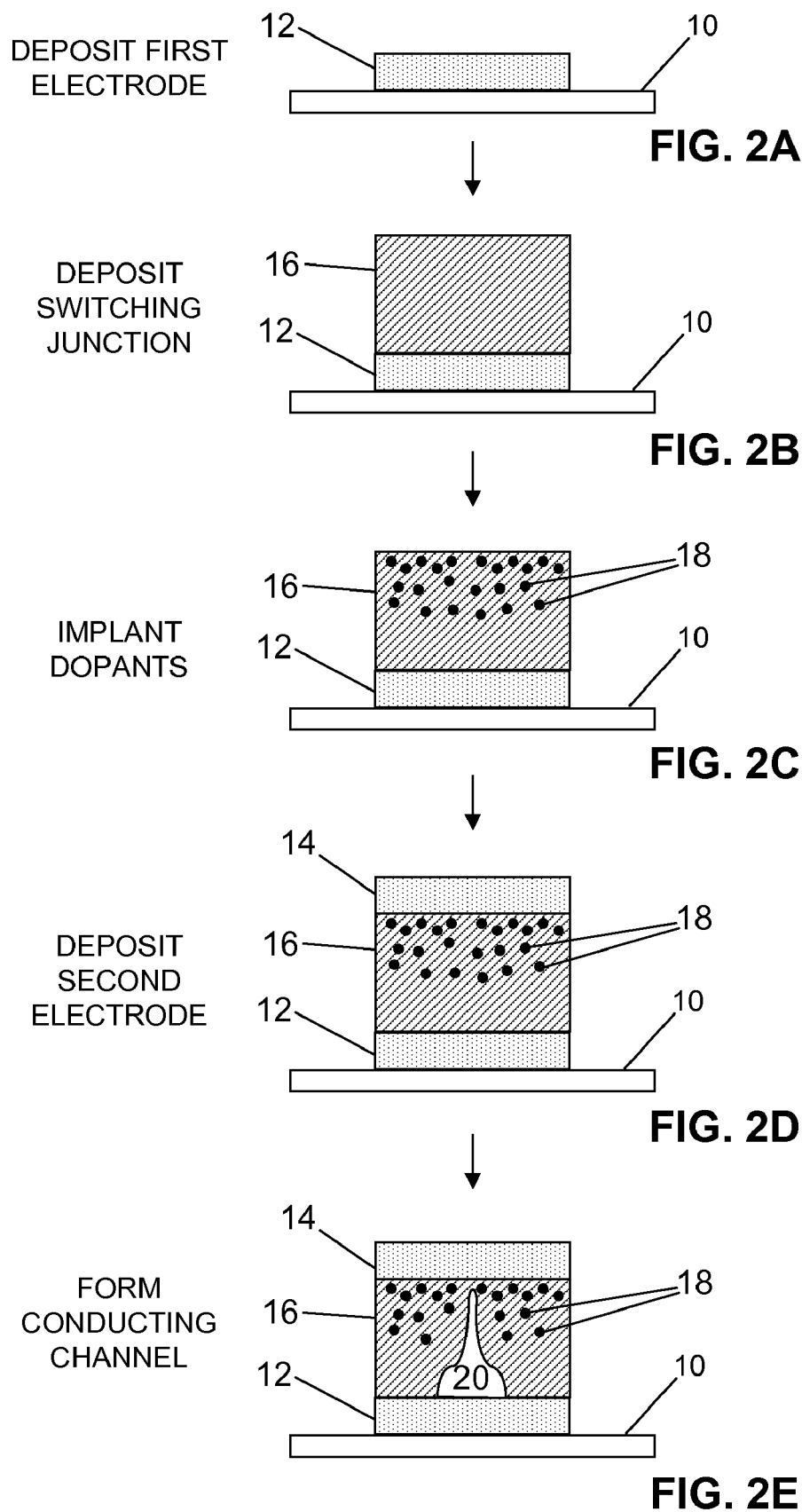

PRESSURE SENSOR GRID

BACKGROUND

Nanometer-scale crossed-wire switching devices have been reported that can be switched reversibly and exhibit an ON-to-OFF conductance ratio of about $10^3$. Such devices have been used to construct crossbar circuits at the micro- and nanoscales. These switching devices also provide a promising route for the creation of devices based on ultra-high density non-volatile electronic components.

BRIEF DESCRIPTION OF THE DRAWINGS

FIGS. 2A through 2E are schematic views depicting an embodiment of the method for making a pressure sensor.

DETAILED DESCRIPTION

Reference will now be made to the exemplary embodiments illustrated, and specific language will be used herein to describe the same. Features and advantages of the invention will be apparent from the detailed description which follows, taken in conjunction with the accompanying drawings, which together illustrate, by way of example, features of the invention.

A pressure sensing device can be based on microscale or nanoscale devices that exhibit pressure-induced conductances. Such devices can comprise a first electrode, a second electrode, and a switching junction situated between the electrodes. The switching junction can further comprise dopants or dopant initiators that can be activated to impart conductive properties to the device. The device may also comprise one or more conducting formations that serve to direct current through the switching junction.

Figure 1:
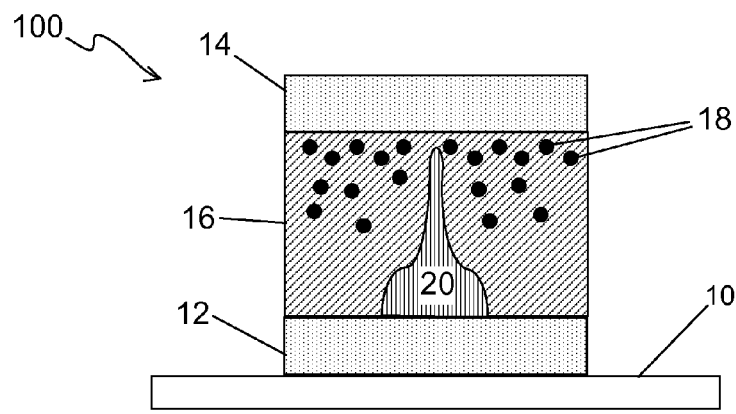
FIG. 1 is a cross-sectional illustration of a pressure sensor in accordance with an embodiment.

FIG. 1 provides an illustration of a device 100 in accordance with an embodiment. A substrate 10 can be prepared for deposition of device components by conventional techniques that are suited for the materials used. The device includes a first (bottom) electrode 12 and a second (top) electrode 14. The terms "top" and "bottom" with regard to electrodes are used to provide a frame of reference for discussing the relative position of components. It will be understood however that, depending on the orientation of the device, the first electrode may not necessarily be bottommost and the second electrode may not necessarily be topmost. The electrodes may comprise one or more metals or other suitable materials. Non-limiting examples of suitable metals include gold, platinum, tungsten, and copper. Such metal electrodes may be fabricated by photolithography or electron beam lithography, or by more advanced techniques, such as imprint lithography. The thickness of this electrode and the second electrode may be chosen according to specifications desired for the device. In one embodiment, the thickness of the electrode ranges from about 5 nm to about 30 nm.

The first electrode is deposited on the substrate followed by deposition of a layer of material to form a switching junction 16. The switching junction serves as the region of the device in which variable conductance characteristics are generally exhibited, and particularly where pressure-induced conductances occur. The switching junction can comprise any material suitable as a dielectric in semiconductor devices. The switching junction material may be in a crystalline or an amorphous state. Non-limiting examples include oxides, sulfides, selenides, nitrides, phosphides, arsenides, chlorides, and bromides of silicon, transition metals, rare earth metals, or alkaline earth metals. In a particular embodiment, the switching junction material comprises a metal oxide. Non-limiting examples of such materials are titanium dioxide, hafnia, zirconia, strontia, and alumina.

The switching junction can further include dopant species 18 that can be activated to serve as charge carriers and provide a particular conductance state to the device. More particularly, the dopant species may include dopants that can be reversibly activated, that is their ability to participate in charge transport can be activated or deactivated by an appropriate activating or deactivating energy. The dopants may be any molecular species or defect that is capable of trapping or releasing electronic charge carriers (i.e. electrons or holes) under the appropriate conditions. These include implanted molecular species that can be activated to act as charge carriers, as well as molecular vacancies generated in the switching junction material. The dopants may be appropriate molecular species implanted in the junction, or may be defects created in the junction material by conventional techniques.

The dopants may be situated in the junction so as to be accessible for electronic conduction. In a particular embodiment, the switching centers may be situated substantially adjacent to the surface of the junction that interfaces with one of the electrodes. In one aspect, the switching centers may be present in a layer applied to or created in the switching junction. In another aspect, the switching centers may be individually implanted at or slightly below the surface of the switching junction.

The device can further comprise a conducting channel 20 formed so as to guide current through the device according to a particular geometry. In a particular embodiment, the device includes a conducting channel that originates from near the first electrode 12, extends through the junction, and has an end that is near the second electrode 14. To focus and concentrate current flow, the conducting channel can exhibit a marked taper from its origin to its end. In a particular embodiment, the end may be less than about 5 nm in diameter. In a more particular embodiment, the end may be less than or equal to about 1 nm in diameter. In a particular embodiment the conducting channel is made so that the end is within 5 nm from the top electrode.

In a particular aspect, the conducting channel 20 as a whole or parts thereof may be substantially hollow. In a more particular aspect, the conducting channel is substantially hollow from its origin to its end. In such embodiment, current may travel substantially along the contours of the channel, rather than through the hollow space inside it. In an alternate embodiment, the conducting channel may include conductive material. In one aspect, the conducting channel can comprise a thin filament of conductive material. In a more particular aspect of this embodiment, the conductive material may include metal from the first electrode 12. In another alternative embodiment, at least part of the space between two electrodes can substantially comprise an air gap or vacuum, and the conducting channel is formed so as to nearly cross the gap.

The device 100 can be switched from a largely resistive state ("OFF") to a state more amenable to conduction ("ON") by applying a bias voltage of sufficient magnitude and duration to activate dopants in the switching junction. The polarity, and strength of the activating voltage can be chosen based on the charge of the dopants involved, as well as the degree of activation sought. The state may be reversed (i.e. the device can be switched from "ON" to "OFF") by applying a sufficient voltage of the opposite polarity.

The pressure sensor function of the device 100 arises from properties by which pressure applied to the device causes an increase in conductance through the device. Particularly, the response may be caused by pressure directed through the layers of the device. For example, the device may respond to pressure applied to the top electrode and in the general direction of the bottom electrode. However, a similar response may be elicited by pressure applied to the bottom electrode in the general direction of the top electrode. In a particular aspect, the increase in conductance between the two electrodes can vary in magnitude with the pressure applied. In a more specific aspect the change in conductance can vary substantially linearly with increasing pressure. In another specific aspect, the change in conductance varies exponentially with increasing pressure. By direct or indirect measurement of the device conductance, the presence of an applied pressure can be detected. In addition, the intensity of the pressure can be determined from the magnitude of the conductance change.

Without wishing to be bound to a particular theory, application of pressure may induce an increase in conductance in the device by any one mechanism or combination of mechanisms. The conductance increase may arise due to the pressure causing electrical contact between the conducting channel and the top electrode. In one aspect this contact may include actual physical contact. This can occur when the conducting channel is fabricated so that the end is a very small distance from the top electrode. The channel end may make a point contact with the top electrode when pressure is applied to the device.

In another aspect, the electrical contact arises in part from a pressure-induced change in the switching junction material between the channel end and the top electrode 14. For example, nanostructural features may be present in the material that are suited to create unitary conductances under physical pressure. In one aspect, pressure may cause a short chain of molecular charge carriers to align between the conducting channel and the top electrode, thereby creating a temporary change in conductance. These charge carriers can be dopants, including vacancies. In a particular embodiment, the pressure-induced conductances occur in a device in which at least some dopants are activated.

The sensitivity to pressure exhibited by a pressure sensor can be due at least in part to aspects of the sensor's design. For example, a sensor may be made more or less sensitive by forming the conducting channel 20 to end closer or farther from the second electrode 14. In another aspect, the sensitivity may be affected by the dopants included in the switching junction. For example, sensitivity may be increased by implanting a higher concentration of dopants or activating a larger population of the implanted dopants. By such manipulation, a sensitivity best suited to an intended application can be chosen. For example, one level of sensitivity may be better suited to human interface devices, such as those for detecting pressure from a hand or a finger, while a higher level of sensitivity may be utilized for detection of very small pressures.

Pressure sensors according to the present embodiments can exhibit a high degree of sensitivity to pressure. In a particular embodiment, a single device can exhibit changes in conductance in response to pressures on a minute scale. One example of such a range includes the pressures typically involved in atomic force microscopy, which can fall in the piconewton range. In a more particular embodiment, forces in the nanonewton to piconewton range can elicit an increase in conductance in a sensor device, and therefore be detected by the device. In a still more particular embodiment, application of a force of 2 μN or less causes an increase in conductance in a sensor device. As discussed above, the change in conductance can vary with the intensity of the pressure applied. Therefore, the sensitivity of the disclosed devices can also provide an ability to measure changes in pressure with a high degree of precision.

The present disclosure also sets forth methods by which a pressure sensor according to the above embodiments may be made. An embodiment of such a method is illustrated in FIGS. 2A-2E. According to the embodiment, the first electrode 12 may be deposited as an initial step, shown in FIG. 2A. The electrode may be deposited on a conventional substrate 10 by techniques known to be appropriate to the material used. Non-limiting examples of substrate materials include silicon dioxide, silicon nitride, magnesium oxide, strontium titanate, and glass. Metal electrodes may be made by photolithography or electron beam lithography, or by more advanced techniques, such as imprint lithography. The thickness of this electrode and the second electrode may be chosen according to specifications desired for the device. In one embodiment, the thickness of the electrode ranges from about 5 nm to about 30 nm.

A switching junction 16 may then be deposited onto the first electrode from junction material, as described above and shown in FIG. 2B. The junction material may be deposited by conventional techniques, including evaporation from a Knudsen cell, electron beam from a crucible, sputtering from a target, electron beam evaporation, chemical vapor deposition (CVD), metal-organic chemical vapor deposition (MOCVD), molecular beam epitaxy, atomic layer deposition, sputtering or other forms of chemical vapor or beam growth from reactive precursors. The thickness and area of the switching junction may be chosen based on desired device characteristics, e.g. pressure sensitivity as discussed above. Particular considerations in selecting the dimensions may arise regarding the formation of the conducting channel later in the process as described below. That is, the active region can have a thickness that allows the channel to extend to within a particular distance from the implanted switching centers or from the second electrode.

Dopants can be added to the switching junction (FIG. 2C), by conventional techniques, including bombardment implantation and plasma immersion. Other doping approaches known in the art can also be used, such as in-situ doping upon deposition of the switching junction.

After the switching junction has been deposited, the top electrode 14 may be deposited onto the switching junction (FIG. 2D). In one embodiment, the second electrode may be deposited on a surface of the switching junction that is substantially opposite the surface adjacent to the first electrode.

A concluding step in making the device can comprise forming a conducting channel 20 through the switching junction 16, as shown in FIG. 2E. In a particular embodiment, the channel is created by an electroforming technique. More specifically, such a technique can comprise initially applying a brief voltage bias stress between the two electrodes, which creates a localized conducting channel 20 extending from the first electrode toward the second electrode through the otherwise resistive junction material. The conducting channel may be a thin filament of conductive material. The conductive material may be drawn from other components of the device, such as the first electrode 12, as the filament is formed. While not wishing to be bound to a particular theory, it is believed that formation of the channel may occur through any of a number of mechanisms including electrode melting or other electrode deformation, solid electrolysis, electromigration, field-induced dislocation, electroreduction of junction material, or any combination of these. One result of the creation of the channel can be that only a thin layer of junction material remains between the channel end and the second electrode 14. The dopants in this layer can define the electrical conduction between the second electrode and a more resistive part of the device (i.e. the remaining layer of junction material adjacent to the channel end).

Figure 3:
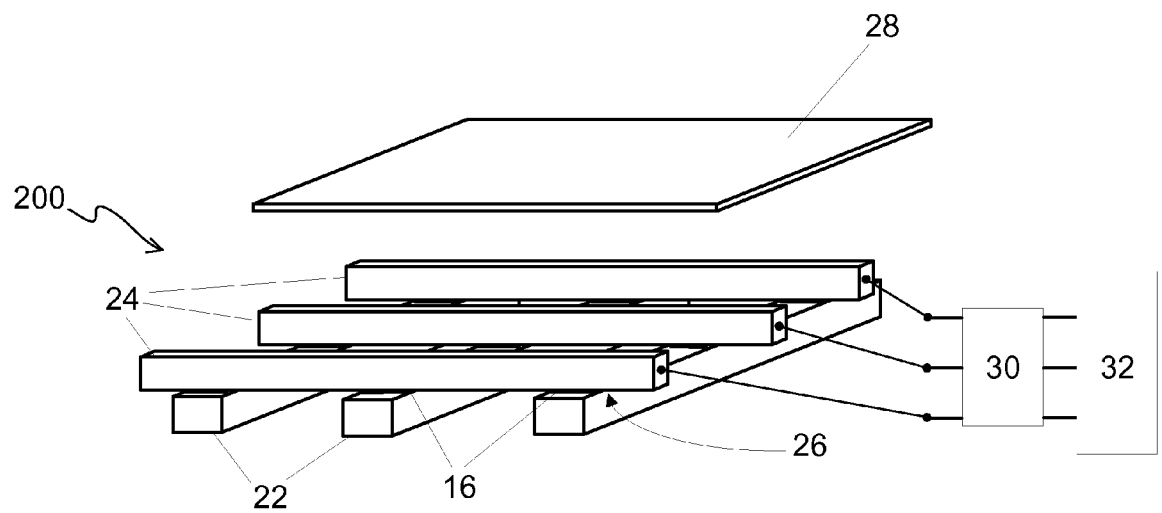
FIG. 3 is a perspective view of a device comprising a pressure sensor grid having a number of pressure sensors as in FIG. 1 in accordance with another embodiment.

In an embodiment, a plurality of pressure sensors as described above can be connected to provide a sensor grid. Such a grid can be used to provide high-resolution pressure localization as well as more sensitive pressure measurement than a single sensor. In a particular embodiment, a sensor grid can be based on a crossbar array of microwires or nanowires. As shown in FIG. 3, a sensor grid 200 can comprise a layer of approximately parallel bottom wires 22 that is overlaid by a layer of approximately parallel top wires 24. In a particular embodiment, the top wires 24 are roughly perpendicular in orientation to the bottom wires 22. It is to be understood, however, that the orientation angle between the top wires and bottom wires may vary. In a particular embodiment, the wires within a layer are electrically isolated from each other.

The two layers of wires form a lattice structure. In a particular embodiment, each top wire 24 overlies all of the wires 22 of the bottom layer, and comes into close proximity with each bottom wire at intersections 26. At each intersection, a switching junction 16 is disposed between wires 22, 24. The switching junctions are arranged as described above, i.e. each junction can include a conducting channel and dopants. The resulting device therefore includes a plurality of pressure sensors, each comprising a switching junction, a top wire 28 as its top electrode, and a bottom wire 22 as its bottom electrode, wherein the sensors are interconnected via the wires 22, 24.

Although individual wires in the figures are shown with square or rectangular cross-sections, wires may also have circular, elliptical, or more complex cross-sections. The wires may also have many different widths or diameters and aspect ratios or eccentricities. The term "nanowire" may refer to wires having one or more layers of sub-microscale wires, microscale wires or wires with larger dimensions, in addition to nanowires.

Each of the pressure sensors in the grid can perform as described above, i.e. pressure applied to each sensor can cause an increase in conductance between the bottom wire and top wire through that sensor. Other characteristics can arise from this mode of function and from the interconnected arrangement of the grid. For example, pressure applied to a layer of the grid may impinge on an area that is not restricted to a single intersection. That is, a focal point of the pressure may occur on a wire between two intersections. Also, an applied pressure may be sufficiently large or diffuse that it affects multiple intersections. In such instances, a plurality of sensors may be affected by the pressure according to some fraction of the total pressure, and each may exhibit an increase in conductance corresponding in degree to that fraction. Therefore, by measuring the conductance of the sensors in the grid, one may ascertain where pressure is applied by which sensors experience a change in conductance. In addition, a profile of the pressure (e.g., breadth, length, or diameter) may be ascertained by the pattern of conductance changes occurring in the grid. As such the sensor grid can provide a pressure mapping function.

In another aspect of the embodiment, the arrangement of the grid can provide a higher degree of precision in characterizing pressure applied to the grid. That is, the pressure is not only detected by the response of a single sensor at its focus, but also to varying degrees by other sensors less directly affected. The intensity of the pressure can therefore be expressed both by the number sensors involved as well as the degree of response exhibited by each of the sensors. Therefore, the various conductances exhibited by a plurality of pressure sensors can provide a measure of pressure intensity having a higher resolution than a single sensor.

Each of the aspects discussed above with respect to the grid can vary with the overall dimensions of the grid, such as the total number of sensors, as well as the density at which the sensors are arranged. In a broad sense, the number of sensors constituting the grid may be limited only by the area of the substrate on which the grid is fabricated, as well as the limitations of the deposition technique used. More particularly, practical limitations may exist, such as the capacity to monitor a large number of sensors in a useful time frame. However, sensor arrays in accordance with the present embodiments can have dimensions that are suitable for very high resolution detection and mapping of minute pressures. That is, the sensor grid can be designed to provide pressure mapping resolution in a range analogous to megapixel or gigapixel image resolution. In one particular embodiment, the grid can have a dimension of up to 1024×1024 sensors to provide a megapixel array. In another embodiment the grid can have a dimension of up to 3000×3000 sensors.

A pressure mapping device can comprise a pressure sensor grid 200 according to the embodiments described above. Such a device can comprise additional components that facilitate a pressure mapping or sensing function. In a particular embodiment, the device can include a cover layer 28 overlaid on the grid. The cover layer can serve as a uniform surface that communicates pressure applied to the cover layer to the sensors. In particular, the cover layer can provide a surface to open spaces in the grid, so that pressure applied to such a space can be communicated to the surrounding intersections.

A pressure mapping device can further comprise instruments and/or components connected to the grid and configured to detect conductance changes in the grid. Components can include sensors for monitoring and/or transforming electrical signals from the grid so that pressure-induced changes in conductance can be detected and measured. Accordingly, a conductance sensor 30 configured for detecting increases in conductance can be operably connected to the grid, as illustrated in FIG. 3. More particularly, such a component may be connected to individual sensors in the grid. Alternatively, such a component may be connected to multiple sensors by each connection, e.g. where each connection is made to a wire in the grid, as illustrated in FIG. 3. Such a sensor may function by measuring the current through one or more sensors resulting from a set voltage established between the electrodes.

A processor 32 may also be connected to the grid via the conductance sensor as also shown in FIG. 3. Such a processor can include elements conventionally used in electronic devices, including filters, amplifiers, rectifiers, analog-to-digital converters, logic gates, integrators, and differentiators. The conductance sensor and/or processor may be situated in a standalone device that is connected to the sensor grid. Alternatively, these components may reside on solid-state semiconductor devices connected to the grid.

A processor 32 or similar component can be connected to the grid so as to provide a particular functionality. In one embodiment, a pressure mapping function may be provided by connecting a processor to the grid so that each pressure sensor is individually addressable. Pressure-induced conductance increases can therefore be associated with a specific location on the sensor grid, so that the location of the pressure can be determined from the spatial pattern of responses. The processor can include components configured to operate on the response including x/y decoders, shift registers, serial registers, and logic switches. Particularly high-density mapping devices may also include diodes or other components to reduce cross-talk between sensors.

In another embodiment, a processor can be connected to one or more wires in the grid, where each wire is a part of multiple sensors. In this arrangement, the conductance increases from more than one sensors may be detected as a group, making each connection more sensitive to small pressures.

Summarizing and reiterating to some extent, a pressure sensor has been described which can include a switching junction disposed between two electrodes. The device can exhibit changes in conductance as a result of pressure applied to the device. This sensor may prove particularly useful in fabricating highly sensitive pressure sensor devices, including pressure mapping devices.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A pressure sensor grid, comprising:
   a plurality of bottom wires, arranged substantially parallel to each other;
   a plurality of top wires arranged substantially perpendicular to the bottom wires and overlaying the bottom wires at a plurality of intersections, and
   a pressure sensor at each intersection, comprising a switching junction situated between the bottom wire and the top wire; and a conducting channel having an origin adjacent to the bottom wire and extending through the switching junction, wherein pressure applied to the top wire causes an increase in conductance between the bottom wire and the top wire.

2. The pressure sensor grid of claim 1, wherein the increase in conductance varies with an intensity of the pressure applied.

3. The pressure sensor grid of claim 2, wherein the increase in conductance varies exponentially with the intensity of the pressure applied.

4. The pressure sensor grid of claim 1, wherein the increase in conductance is caused by a pressure having a value of about 2 µN or less.

5. A pressure sensing device, comprising:
   a pressure sensor grid as in claim 1;
   a conductance sensor operably connected to the pressure sensor grid by a connection and configured to detect conductances at the pressure sensors; and
   a processor operably connected to the conductance sensor.

6. The pressure sensing device of claim 5, further comprising a cover layer overlaying the top wires of the pressure sensor grid.

7. The pressure sensing device of claim 5, wherein the connection is configured so that a plurality of pressure sensors are each addressable by the processor.

8. The pressure sensing device of claim 5, wherein the connection is configured to combine conductances from a plurality of pressure sensors.

9. The pressure sensing device of claim 5, wherein the processor is configured to measure an intensity of the pressure by measuring the increase in conductance between the bottom wire and the top wire.

10. A method of fabricating a pressure sensor, comprising:
    depositing a first electrode onto a substrate;
    depositing a switching junction onto the first electrode;
    depositing a second electrode onto the switching junction;
    placing dopants in the switching junction; and
    forming a conducting channel through the switching junction, wherein the conducting channel has a channel end.

11. The method of claim 10, wherein the switching junction comprises a metal oxide.

12. The method of claim 10, further comprising activating the dopants.

13. The method of claim 10, wherein the forming step is accomplished by establishing an electroforming voltage between the first electrode and the second electrode sufficient to electroform the conducting channel.

14. A method of detecting pressure, comprising:
    providing a pressure sensor, comprising:
    a first electrode;
    a second electrode;
    a switching junction situated between the first electrode and the second electrode, wherein the switching junction includes dopants; and
    a conducting channel having an origin adjacent to the first electrode and extending through the switching junction, and having a channel end, wherein a pressure applied to the second electrode causes an increase in a conductance between the first electrode and the second electrode;
    applying a pressure to the second electrode; and
    detecting the increase in conductance between the first electrode and the second electrode through a conductance sensor operably connected to the pressure sensor.

15. The method of claim 14, wherein the pressure is directed to the second electrode through a cover layer overlaying the second electrode.

16. The method of claim 14, further comprising measuring an intensity of the pressure by measuring the increase in conductance between the first electrode and the second electrode.

17. The method of claim 14, further comprising interconnecting a plurality of pressure sensors in a grid arrangement.

18. The method of claim 14, wherein the conductance sensor detects an increase in conductance in a plurality of pressure sensors.

19. The method of claim 18, wherein the conductance sensor detects the increase in conductance in each of the plurality of pressure sensors separately.

20. The method of claim 18, wherein the conductance sensor detects increases in conductance from the plurality of pressure sensors as a group.

* * * * *